United States Patent
Friedman

[11] 3,966,633
[45] June 29, 1976

[54] WASTE WATER PROCESSING

[75] Inventor: Louis D. Friedman, New Brunswick, N.J.

[73] Assignee: Cogas Development Company, Princeton, N.J.

[22] Filed: Sept. 23, 1974

[21] Appl. No.: 508,395

[52] U.S. Cl. .............................. 252/373; 48/197 R; 48/202
[51] Int. Cl.² ........................ C07C 1/02; C10J 3/12
[58] Field of Search ........... 48/202, 197 R; 252/373; 208/8

[56] References Cited
UNITED STATES PATENTS

| | | | |
|---|---|---|---|
| 3,375,175 | 3/1968 | Eddinger et al. | 201/31 |
| 3,505,204 | 4/1970 | Hoffman | 48/202 X |
| 3,540,867 | 11/1970 | Baron et al. | 48/197 R |
| 3,725,270 | 4/1973 | Tassoney et al. | 252/373 X |
| 3,752,771 | 8/1973 | Dille et al. | 252/373 |
| 3,759,837 | 9/1973 | Dille et al. | 252/373 |
| 3,850,839 | 11/1974 | Seglin et al. | 252/373 |

OTHER PUBLICATIONS

R. J. Klett, "Treat Sour Water for Profit," Hydrocarbon Processing, pp. 97–99 (Oct. 1972).

Primary Examiner—Joseph Scovronek

[57] ABSTRACT

Waste water formed in the gasification of coal and containing ammonia, $H_2S$, and phenolic compounds is treated to remove $H_2S$ and a substantial proportion of its ammonia, while leaving sufficient ammonia in the water to maintain a pH of at least 8 (such as up to about 10.5, preferably about 8.5 to 9), the ammoniacal water is then flashed into a stream of superheated steam being fed to gasification zone. At the high temperatures in the gasification zone the organic impurities are decomposed.

2 Claims, 1 Drawing Figure

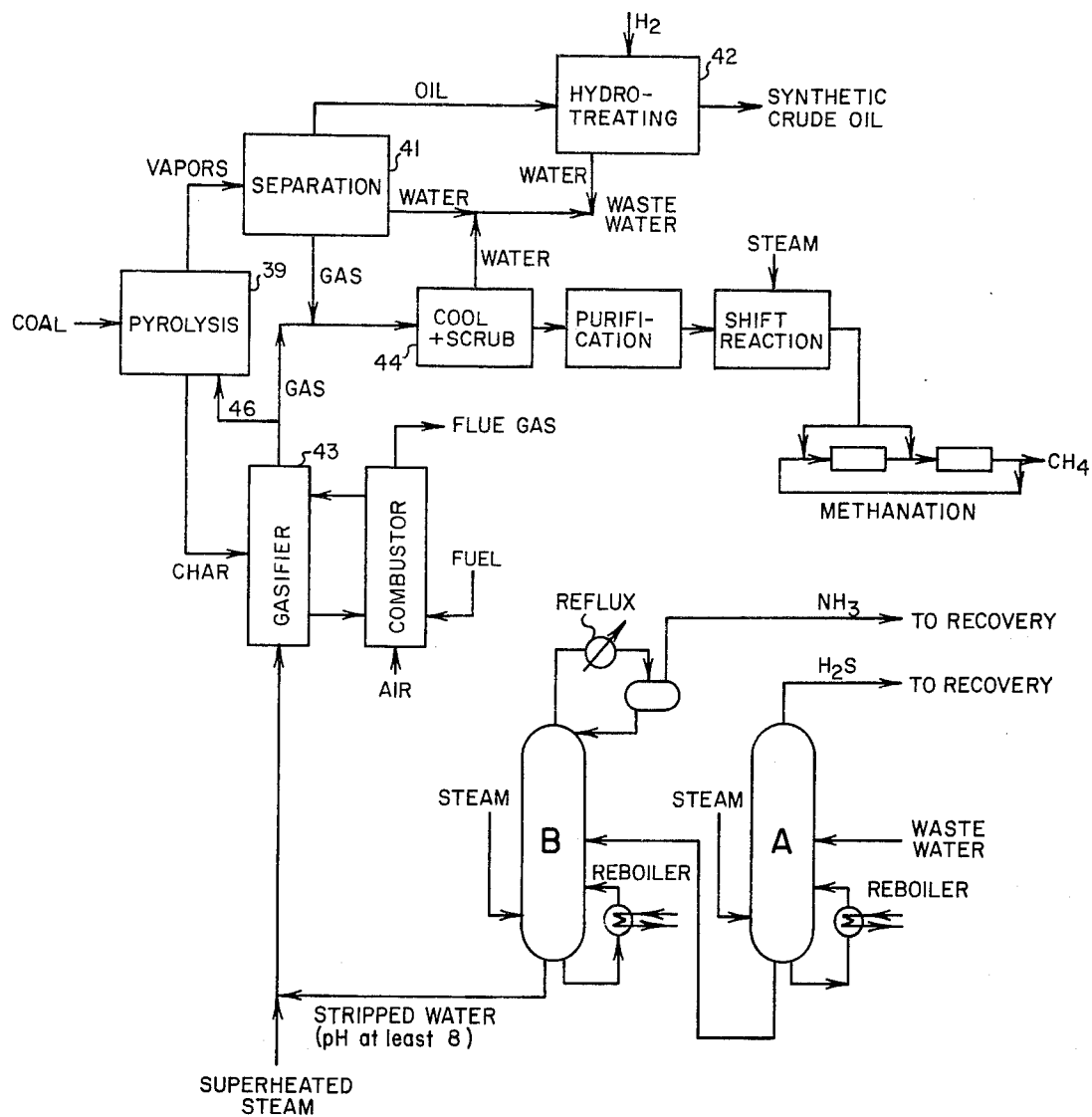

WASTE WATER PROCESSING

This invention relates to a process in which coal is pyrolyzed and reacted with steam to produce mainly carbon monoxide and hydrogen. As is well known the main gasification reaction is one between carbon and steam.

$$C + H_2O \rightarrow CO + H_2$$

This reaction is endothermic. Heat can be supplied indirectly by a heat transfer medium or directly by the addition of oxygen to the gasifier, or by gasifying at high pressures where the exothermic reaction between carbon and hydrogen is thermodynamically favored.

$$C + 2H_2 \rightarrow CH_4$$

The drawing shows the process of the invention for cleaning up waste waters formed in a system of manufacturing SNG (substitute natural gas) and synthetic crude oil from the pyrolysis of coal.

In one preferred process the coal is pyrolized to form a char which is then fed to the gasification zone. In other processes raw coal is fed to the gasification zone and pyrolysis also occurs in that zone. Pyrolysis reactions release tars, oils, tar acids and bases, water, hydrogen sulfide, organic sulfides, ammonia and organic nitrogen compounds. During gasification of a char, oxygen, nitrogen and sulfur compounds in the coal can react to form water, ammonia and hydrogen sulfide. Thus the gaseous streams taken from the gasification zone and from any preliminary pyrolysis zones contain water, including unreacted steam from the gasification zone. Condensation of this water, in the course of purifying the gaseous streams, results in the formation of highly contaminated waste water containing particulate matter, dissolved carbon dioxide, hydrogen sulfide and ammonia, and, depending on the particular process, dissolved organics (tar acids and bases) and traces of oil. Disposal of this waste water through ordinary channels can create serious environmental problems.

In accordance with one aspect of this invention waste water containing $H_2S$, $NH_3$ and organic impurities is treated to remvoe $H_2S$ and a substantial proportion of its ammonia, while leaving sufficient ammonia in the water to maintain a pH of at least 8 (such as up to about 10.5, preferably about 8.5 to 9), the ammoniacal water is then flashed into a stream of superheated steam being fed to gasification zone. At the high temperatures in the gasification zone the organic impurities are decomposed.

The gasification reaction generally is effected at a temperature of about 750° to 1100°C preferably about 850° to 1000°C at pressures from atmospheric up to about 1000 psig or more. In one preferred process the pressure is about 50 to 100 psig. In other known gasification processes considerably higher pressures are used, e.g. about 300–400 psig (such as about 350 psig) in one case and about 1000 psig in another case. The heat for the endothermic gasification reaction may be supplied by a heat carrier material, such as solid heat transfer particles which are heated by the combustion of fuel in a combustion zone (e.g. the "combustor" in the drawing). The resulting hot particles are circulated to the gasification zone (e.g. the "gasifier") and then back to the combustion zone, the combustion and gasification zones being maintained at about the same pressure.

For the heat transfer medium circulated in the combustion zone and gasification zone one may employ, for instance, materials known in the art such as inert refractory pebbles, e.g. of alumina or mullite, agglomerated ash from the burning of coal, calcined dolomite which undergoes an exothermic reaction with $CO_2$ in the gasification zone, char, coke, etc. The gasification zone preferably comprises a fluidized bed of the char or other carbonaceous material into which the steam is fed. The arrangement of gasification and combustion zones is, as previously indicated, preferably such that these zones are maintained at substantially the same pressure, so that little if any of the gas made in the gasifier tends to flow into the combustor and vice versa. For instance the pressure differences between these zones may be about 5 psi or less. Part of the heat for the endothermic gasification reaction can be supplied by the superheat of the steam fed thereto.

In a preferred embodiment both $H_2S$ and part of the ammonia are removed by stripping with steam. Stripping processes of this type are known in the art (see, for instance the article by R. J. Klett in Hydrocarbon Processing Oct. 1972 p. 97–99); in such processes the water is fed to a distillation column having a reboiler and operated so that the impurity ($H_2S$ or $NH_3$ or both) is taken overhead while water of lowered impurity content is taken from the bottom of the column. In a preferred procedure two stripping columns are employed, the first one, A, being operated at a pressure (e.g. about 75 to 125 psig, such as about 100 psig) such that the overhead is substantially anhydrous hydrogen sulfide gas having a relatively low $NH_3$ content (such as less than about 100 ppm, e.g. less than 50 ppm) and a low water content (such as less than 2%, preferably less than 1%, e.g. below about ½%) and the second column, B, generally being operated at a higher pressure (e.g. about 175 to 230 psig, such as about 200 psig) such that the overhead is substantially anhydrous ammonia containing less than about 1% water (e.g. about 0.2 to 0.5% water) while the stream from the bottom of the column is the hot water under pressure and having an $H_2S$ content of less than about 50 ppm, e.g. about 0 to 20 ppm and a pH of at least 8 which is to be flashed into the stream of superheated steam. The temperature of the stream of hot water will be dependent on the pressure employed in the ammonia stripping column; when that is operated at 200 psig (measured at the top of the column, as is conventional) the stream of water from the bottom is at a temperature of about 200 to 210°C. Externally produced steam is preferably fed to each stripper column A and B as indicated on the drawing.

It will be understood that the use of two stripper columns, one for $H_2S$ and the other for $NH_3$, enables one to recover two relatively pure useful products and is therefore desirable. It is, however, also within the broader scope of this invention to use a single column taking off both $H_2S$ and $NH_3$ overhead, e.g. at a pressure of about 200 psig.

The stripped ammoniacal water will preferably contain less than about 6% $NH_3$, such as about 2 to 5% or less. This ammonia is present in association with the phenolic compounds in the water.

The stream of superheated steam into which the stripped ammoniacal water (containing organic impurities) is fed may be generated in an ordinary steam boiler (as by heat-transfer from furnace-heated solid metal tubes). Its temperature may be within the range of about 300° to 600°C, preferably about 350° to 450°C and its pressure preferably may be within the range of about 150 to 550 psig, more preferably about 200 to 300 psig. The proportions and temperatures are such that the resulting mixture (after the flashing of the ammoniacal water) is superheated steam having a temperature preferably within the range of about 200° to 450°C and more preferably about 250° to 350°C and a pressure within the range of about 100 to 450 psig and, preferably about 150 to 250 psig, containing an amount of ammonia preferably in the range of about 0.1 to 1.0 wt. % more preferably below 0.3 wt. %; this mixture is fed directly to the gasifier.

The hot ammoniacal water may be flashed into the superheated steam in any suitable manner, as by spraying it or other wise feeding it (as through a suitable pressure reducing valve when the pressure of the steam stream is below that of the water stream and the temperature of the water stream is above its boiling temperature at the pressure of the steam stream).

As previously mentioned the organic impurities in the waste water are decomposed in the gasifier. Ammonia may be decomposed there to form nitrogen and hydrogen, but the amount of ammonia in the feed to the gasifier is not so large that a significant undesirable dilution of the resulting product gas by nitrogen occurs; the $H_2$ adds to the fuel value.

Because of the retention of some ammonia in the stripped waste water the latter will not be unduly corrosive to steel processing equipment (such as pipes and valves) with which it comes into contact, both in its liquid and vaporized state (e.g. in the lines to the gasification zone).

In one preferred process, shown in the drawing, vapors resulting from low temperature pyrolysis at 39 may be led to a separation zone 41 in which they are cooled to condense oily liquids and water and the aqueous phase is separated from the oily phase. This aqueous phase is typically, say, about 4 to 12% by weight of the coal fed to the pyrolysis zone and contains fairly high concentrations of water-miscible organic compounds (such as phenol, cresols, xylenols, resorcinol, methyl dihydroxybenzene), hydrogen sulfide (e.g. in amount in the range of about 0.1 to 1%, such as about 0.3 to 0.5%) and ammonia (e.g. in amount in the range of about 0.1 to 0.5%, such as about 0.2 to 0.4%), together with water-dispersed higher alkylated phenols, such as a broad spectrum of mixed phenols of the type having two or more carbons in one or more substituents (which substituents may be cyclic) and/or three or more methyl substituents, the individual components of this mixture being present in such small proportion as to be dispersed or dissolved in the water. Thus, such compounds as ethyl phenol, propyl phenol, hydroxyindane, dihydroxy ethyl methyl indene, dihydroxyl naphthalene, trimethyl phenol tetramethyl phenol and dimethyl ethyl phenol may be present, among others.

In the process illustrated in the drawing, the oily liquids are then purified at 42 to remove heteroatoms and reduce their viscosity. One method for doing this involves hydrogenation which converts combined nitrogen, oxygen and sulfur to ammonia, water and hydrogen sulfide, respectively, and yields a two phase mixture comprising an aqueous phase and an organic phase, the latter being a combustible light hydrocarbon oil, which may be further refined or treated to produce typical petroleum products such as gasoline, etc. Processes of this type are known in the art, as in "hydrocracking" (such as described in The Oil and Gas Journal April 25, 1966 pages 146–167). The separated aqueous liquor contains water-miscible or water-dispersed organic compounds, such as phenols (e.g. in amount up to about 3%), organic bases (e.g. in amount up to about 1%), hydrogen sulfide (e.g. in amount in the range of about 0.1 to 1%, such as about 0.3 to 0.5%) and ammonia (e.g. in amount in the range of about 0.1 to 0.5%, such as about 0.2 to 0.4%).

The pyrolysis of the coal by low temperature carbonization, e.g. at a final char temperature up to about 700°C, is described in chapter 10 (by Wilson and Clendenin entitled "Low-Temperature Carbonization") of Chemistry of Coal Utilization by H. Y. Lowry, Supplementary Volume published 1963 by Wiley, N.Y.

In one preferred process for carrying out the pyrolysis at 39, the coal is passed through a series of fluidized beds (not shown) at progressively higher temperatures to devolatilize the coal. The process involves partial oxidation of the material only in the very last stages of the process, after about all the condensable volatiles have been removed. Examples of such processes are found in Eddinger, Jones and Seglin Pat. No. 3,375,175 of Mar. 26, 1968, whose entire disclosure is incorporated herein by reference.

The synthesis gas stream produced by the gasification (at 43) of the char contains not only carbon monoxide and hydrogen but unreacted steam, particulate material (such as char fines), $CO_2$, a little ammonia, hydrogen sulfide (e.g. up to about 1% depending on the sulfur content of the coal) and traces of phenolic materials. In the embodiment illustrated in the drawing this gas stream is subjected at 44 to a purification step after it has been mixed with uncondensed material (gas) from the separation step applied to the volatilized products of the pyrolysis; the latter gas (from the separation step) may contain $C_1$-$C_4$ hydrocarbons, CO, $H_2$, $CO_2$, $H_2S$, $NH_3$, COS. The purification at 44 may be effected, for instance, by scrubbing and cooling the gas with plain water (e.g. to reduce the gas temperature to a temperature of about 25° to 200°C, preferably about 40°C, at a pressure of about 25 to 150 psig, preferably about 50 psig); this yields an aqueous waste stream containing dissolved hydrogen sulfide, carbon dioxide, ammonia and particulates and, often, water-soluble or water-dispersed organic compounds (such as phenolic compounds) and traces of water-insoluble oily material. After scrubbing and cooling, the gas still contains such impurities as $H_2S$ and it is preferably given a further treatment, e.g. a solvent extraction (using such solvents as potassium carbonate solution or alkanolamine solutions; see the processes described for instance in the series of articles entitled "Lease-gas Sweetening" which appeared in The Oil and Gas Journal in 1967, Aug. 14, 21 and Oct. 9 and in 1968 Jan. 8, June 3 and 17). The gas may then be subjected to a shift reaction, desirably after reducing the sulfur content of the gas to a very low level as by contact with a suitable material such as zinc oxide.

As illustrated, in one preferred embodiment a portion 46 of the crude synthesis gas stream (e.g. about 15 to 30%, such as about 25%, thereof) from the gasification zone is fed to one or more of the pyrolysis zones 39 to serve as a fluidizing medium therein and its constituents will thus be incorporated with the pyrolysis products.

Also, instead of adding the relatively impure pyrolysis gas from separation zone 41 to the synthesis gas, the pyrolysis gas may be separately treated for removal of $H_2S$ (and $CO_2$), e.g. by solvent extraction as described above, and then washed, as with a liquid hydrocarbon, to remove $C_2$-$C_4$ hydrocarbons. The resulting purified pyrolysis gas may then be mixed with the purified synthesis gas and the resulting gas mixture may then be subjected to a shift reaction, desirably after reducing the sulfur content to a very low level as by contacting the gases, individually or in admixture, with a suitable material such as zinc oxide.

The shift reaction is carried out at a temperature of say about 250° to 550°C desirably at a relatively high pressure, such as 500 psig, in the presence of added steam to convert some of the carbon monoxide in the gas to carbon dioxide and hydrogen, e.g. to give a 1:3 $CO:H_2$ mol ratio. The gas may then be cooled to condense out some of the water content to adjust the water content prior to methanation.

The gas may then be subjected to methanation in which the carbon monoxide and hydrogen react in the presence of a suitable catalyst (such as the known nickel catalyst) to form methane and water. The gas is then cooled to condense out the water. Owing to the purity of the feed gas at this stage, the condensed water is relatively pure and suitable for use in a conventional steam boiler to make steam for the process. In addition the methanation reaction is very exothermic and may be used as a source of heat (by conventional heat-exchange) to produce steam for the process.

The methanation reaction is preferably carried out in stages, as is known in the art. Thus the feed gas stream may be divided into several smaller substreams. One substream is diluted with a stream of recycled methane and fed to a first methanation reactor. The hot gaseous product at a temperature of, say, about 500°C is then cooled, by heat-exchange, to a temperature of, say, about 300°C, and the second substream of feed gas is mixed therewith and fed to a second methanation reactor, and so forth.

For each 100 parts by weight of water fed to the gasifier, the amount of the waste water which is most highly contaminated with organic compounds, i.e. the aqueous pyrolysis liquor generated from the pyrolysis of the coal, generally is in the range of about 8 to 15 parts (e.g. about 11 parts). When a water-containing gas is used for fluidization in the pyrolysis step, (such as the gas stream 46 from the gasification zone) the amount of waste water from the pyrolysis step, e.g. the aqueous phase from separation zone 41, may be about doubled, e.g. it now amounts to about 15 to 20 parts per 100 parts of water fed to the gasifier. The amount of waste water from the purification of the crude gas (e.g. from purification 44) may be in the range of, say 20 to 30 parts; the total amount of waste water from these three steps (pyrolysis, hydrotreating, crude gas purification) is generally below 50 parts such as in the range of about 35 to 45 parts (again per 100 parts of water fed to the gasifier) and the amount of relatively pure water from the methanation step may be relatively large such as about 25 to 35 parts.

The pyrolysis liquor from low temperature carbonization contains a significant proportion of phenolic compounds which have a higher content of alkyl substituents and are much less biodegradable than the phenolic mixture (containing xylenols and cresols) produced by higher temperature carbonization.

In this application all proportions are by weight unless otherwise indicated.

It is understood that the foregoing detailed description is given merely by way of illustration and that variations may be made therein without departing from the spirit of the invention.

I claim:

1. In a system of synthesis gas manufacture including a gasifier wherein fluidized char is reacted with steam using a particulate heat exchange material to sustain the endothermic steam-carbon reaction to produce a synthesis gas stream which on cooling gives water contaminated with $H_2S$ and $NH_3$ and a carbonizer wherein fluidized coal is carbonized below about 700°C to provide said char and vapors which on cooling give oil and water contaminated with $H_2S$ and $NH_3$ and organic materials, the improvement which comprises steam-stripping the contaminated waters to remove the $H_2S$ but retaining sufficient ammonia to keep the pH between about 8.5 to 10.5 and introducing the resulting treated water into the gasifier to provide at least a portion of the steam requirement therefor while consuming the organic materials.

2. Process as in claim 1 in which said $H_2S$ is stripped off at a pressure of about 75 to 125 psig, said ammonia is stripped off at a pressure of about 175 to 230 psig, the ammoniacal water remaining after said ammonia stripping has a pH of about 8.5 to 10.5 and a temperature of at least about 200°C, said stream of superheated steam has a temperature of about 300° to 600°C and a pressure of about 150 to 550 psig, and substantially all of the resulting stream of steam is fed into the gasification zone directly.

* * * * *